United States Patent [19]
Heinrich et al.

[11] Patent Number: 5,199,719
[45] Date of Patent: Apr. 6, 1993

[54] SEALING ARRANGEMENT

[75] Inventors: Richard W. Heinrich, Heilbronn; Klaus-Jürgen Uhrner, Leingarten; Gunther Eggensperger, Heilbronn, all of Fed. Rep. of Germany

[73] Assignee: KACO GmbH & Co., Heilbronn, Fed. Rep. of Germany

[21] Appl. No.: 571,268

[22] Filed: Aug. 22, 1990

[30] Foreign Application Priority Data

Aug. 22, 1989 [DE] Fed. Rep. of Germany ....... 3927589

[51] Int. Cl.$^5$ .............................................. F16J 15/38
[52] U.S. Cl. .................................. 277/40; 277/81 R; 277/86; 277/208; 277/88; 277/92
[58] Field of Search .................. 277/38, 40, 85, 86, 277/208, 81 R, 88, 92, 213, 35, 36, 39, 65; 415/170.1, 174.2

[56] References Cited

U.S. PATENT DOCUMENTS

| | | | |
|---|---|---|---|
| 2,599,121 | 6/1952 | Park | 277/86 |
| 2,645,507 | 7/1953 | Isenbarger | 277/40 |
| 2,881,014 | 4/1959 | Amitault et al. | 277/86 |
| 3,278,191 | 10/1966 | Gits et al. | 277/40 |
| 3,314,681 | 4/1967 | Talamonti | 277/86 |
| 3,554,559 | 1/1971 | Dahlheimer | 277/37 |
| 4,124,219 | 11/1978 | Uhrner | 277/40 |
| 4,502,697 | 3/1985 | Heinl | 277/81 R X |
| 4,548,547 | 10/1985 | Deuring | 277/88 X |
| 4,696,479 | 9/1987 | Karcher | 277/38 X |
| 4,721,312 | 1/1988 | Hornberger | 277/38 X |
| 4,779,876 | 10/1988 | Novosad | 277/81 R |
| 4,795,167 | 1/1989 | Otsuka | 277/92 X |
| 4,854,598 | 8/1989 | Deuring | 277/92 X |
| 4,886,281 | 12/1989 | Ehrmann et al. | 277/35 X |
| 4,903,971 | 2/1990 | Bauer | 277/208 X |
| 4,973,224 | 11/1990 | Pesch | 277/88 X |
| 5,123,660 | 6/1992 | Dahlheimer et al. | 277/88 |

FOREIGN PATENT DOCUMENTS

| | | | |
|---|---|---|---|
| 461012 | 11/1949 | Canada | 277/85 |
| 2729928 | 1/1980 | Fed. Rep. of Germany. | |
| 80853 | 5/1963 | France | 277/40 |

Primary Examiner—William A. Cuchlinski, Jr.
Assistant Examiner—J. K. Folker
Attorney, Agent, or Firm—Robert W. Becker & Associates

[57] ABSTRACT

A sealing arrangement is provided and includes a slide ring seal, and a counter ring that is accommodated in a holder that is provided with a presser sleeve via which, in an installed state, the sealing arrangement is seated with a press fit on a component that is to be sealed. The presser sleeve is disposed between a sealing zone and a holding zone, with the sealing zone being made of a material that has a higher elasticity than does the presser sleeve.

23 Claims, 4 Drawing Sheets

SEALING ARRANGEMENT

BACKGROUND OF THE INVENTION

The present invention relates to a sealing arrangement, including a slide ring seal means, and a counter ring that is accommodated in a holder means that is provided with a presser sleeve via which in an installed state, the sealing arrangement is seated with a press fit on a component that is to be sealed, especially a pump shaft.

Known sealing arrangements of this type serve to seal off pump shafts. Such sealing arrangements have a slide ring seal means with a housing, and a counter ring with a holder means. The slide surface of the slide ring and the slide surface of the counter ring are held in sealing contact by means of a compression spring. The slide ring and the housing are inserted into a pump housing, while the holder means of the counter ring is seated upon the pump shaft via a tubular holder (presser sleeve).

In the non-installed state of the sealing arrangement the slide ring seal means and the counter ring are interconnected by the metallic holder means, with the housing of the holder means, starting from an inner bore of the holder means, extending entirely or partially behind the counter ring and the slide ring seal means in order in this manner to prevent the counter ring and slide ring seal means from coming apart in the effective direction of the compression spring.

When the sealing arrangement is installed, the counter ring holder means is pressed upon the pump shaft, so that during operation the holder means and the counter ring rotate along with the pump shaft. In order during operation of the pump to prevent the medium that is to be sealed from escaping through a sealing gap between the slide surfaces of the slide ring and the counter ring, the front movement deviation of the slide surface of the counter ring must be as small as possible. For coolant pumps of motor vehicles, this deviation is a maximum of 0.1 mm. However, such a small front movement deviation can be maintained only at great manufacturing and control expense, because in so doing not only does the front movement deviation of a radially directed inner wall of the holder means relative to the inner bore thereof play a role, but also the parallelism deviation of the boundary surfaces of an outer holding sleeve as well as the slide surface and the backside of the counter ring play a role. Added to this can also be errors in positioning that occur when the counter ring and outer holding sleeve are pressed into the holder means.

In the installed state, the slide ring seal means is pressed into a receiving bore of the pump housing. During installation, the counter ring holder means is pressed by a non-illustrated tool onto the pump shaft, and is so doing is pressed against the slide ring seal means until an operating length is achieved at which a conically widened portion of the holder means has assumed a certain distance from the housing of the slide ring seal. This distance is necessary in order to achieve a freedom of rotation between the holder means and the slide ring seal means. Due to the metallic counter ring holder means, the position of the counter ring upon the pump shaft is fixed by the metallic press fit and not by axial support via a fan wheel. Rather, between the fan wheel and the holder means there is a gap that precludes contact between the fan wheel and the holder means. The working length is therefore affected merely by the precision of the press-in tool and not by the position of the fan wheel upon the shaft.

The frictional connection produced by the press fit between the holder means and the shaft must be great enough that not only a shifting of the holder means on the shaft due to the force of the compression spring and due to the force that acts in the direction of the slide ring seal means from the hydraulic pressure of the medium that is to be sealed but also a twisting of the holder means relative to the shaft due to the frictional moment resulting in the sealing gap, are reliably prevented. To reliably transfer the forces or frictional moment, a relatively short press fit in the axial direction would suffice, since the forces and the moment are relatively low. However, the press fit connection between the holder means and the shaft must in addition be medium-tight in order to prevent the medium that is to be sealed from escaping between the holder means and the shaft. For this reason, the press fit length is in practice relatively long, especially since with metallic press fits, the formation of roughness and hence leakage areas at both joint surfaces cannot be reliably precluded. In order to prevent leakage areas between the two joint surfaces, it is additionally necessary to set at the inner bore of the holder means very high requirements with regard to diameter tolerance, concentricity deviation, cylinder shape deviation, and surface quality. These requirements can be fulfilled only at high manufacturing and control expense.

A further drawback of the heretofore known sealing arrangements consists in that the conically widened portion of the holder means must have a greater outer diameter than the inside diameter of the slide ring seal means in order in a non-installed state of the sealing arrangement to prevent a separation of the holder means from the slide ring seal means. The result is that the widened portion can only be produced in an additional step after the holder means and the slide ring seal means have been joined together. This has the further drawback that during provision of the widened portion, the inner bore of the holder means can be deformed to an unacceptable extent. Finally, the heretofore known sealing arrangements cannot be removed, for example for inspection purposes, without destroying the holder means, since for this purpose the widened portion must be returned to its original shape.

It is therefore an object of the present invention to provide a sealing arrangement of the aforementioned general type that has an increased functional reliability while at the same time having reduced manufacturing and control costs.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
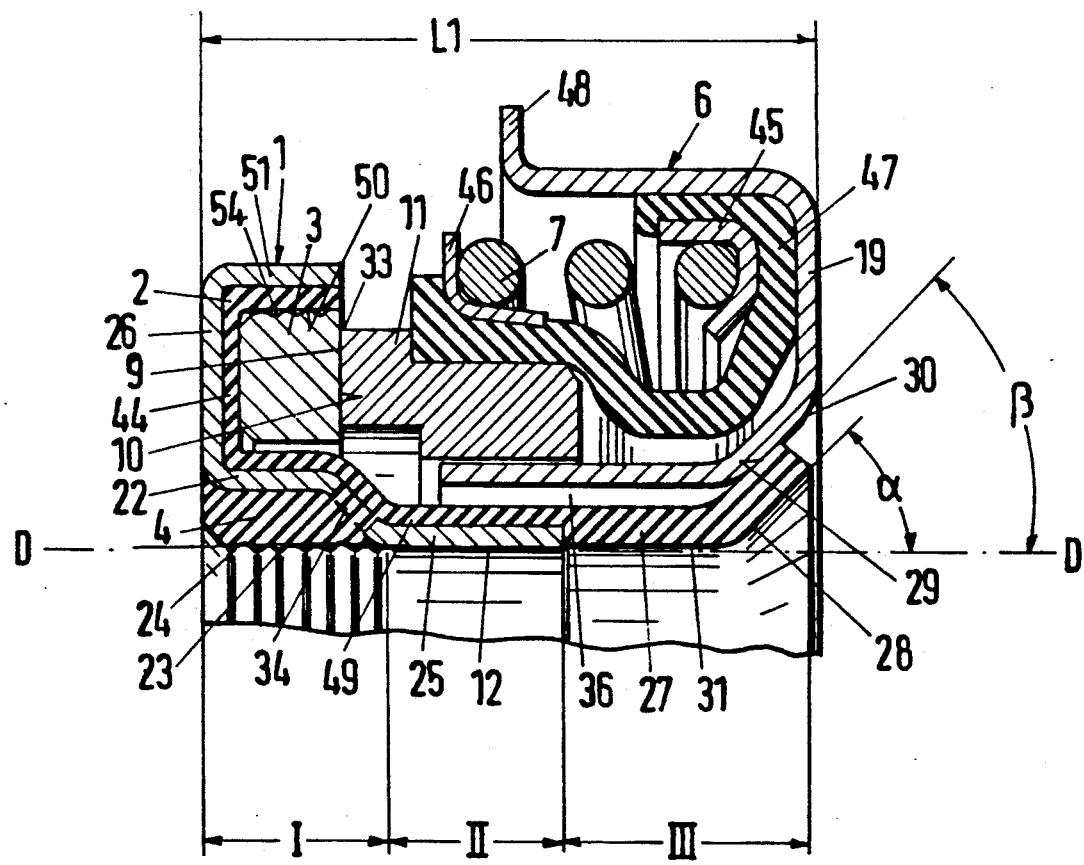
FIG. 1 is an axial cross-sectional view through one half of one exemplary embodiment of the inventive sealing arrangement.

The sealing arrangement of the present invention is characterized primarily in that the presser sleeve is disposed between a sealing zone and a holding zone, with the sealing zone being made of a material that has a higher elasticity than does the presser sleeve.

As a consequence of the inventive configuration, the inner region of the bore of the holder means is divided into at least three zones that have different functions, namely the sealing zone, the tight fit zone that is provided by the presser sleeve, and the holding zone. The individual functional zones are preferably produced of materials having different elasticities. For example, the sealing zone is preferably made of a material having a very high elasticity, such as rubber, while the tight fit zone is made of a material having a relatively low elasticity, such as metal, and the holding zone is made of a material having a high elasticity, such as rubber.

With the inventive approach, the double function that the inner bore of the holding means has and which concerns the transfer of the forces in the axial and circumferential directions and also concerns the sealing of the leakage paths between the pump shaft and the holder means, is split between two regions or zones of the holder means that differ from one another with regard to the material thereof and in their construction. As a result, it is possible to optimize the functional reliability and manufacturing costs for each functional zone. With the inventive sealing arrangement, the sealing zone is preferably disposed at that end of the holder means remote from the slide ring seal means and essentially radially inwardly of the counter ring that is pressed into the holder means. Since now the seating surfaces of the holder means need only transfer the compressive forces or the frictional moment, the requirements regarding the surface quality of the seating surfaces can be considerably reduced in contrast to the requirements for heretofore known sealing arrangements. Since the seating surfaces no longer have a sealing function, the requirements regarding concentricity and cylinder shape deviation can also be reduced. In addition, roughness on the seating surface that might occur when the sealing arrangement is pressed onto the shaft no longer adversely affects operation since the seating surface has no sealing function. For this reason, during dimensioning of the seating surfaces it is merely necessary to take into consideration the forces (compressive force, spring force, friction moment) that are to be transmitted, as a result of which in the axial direction, due to the only slight forces that are to be transmitted, on the one hand with the inventive approach a very short length for the presser sleeve can be realized. On the other hand, in conformity with the low holding forces correspondingly low press-on forces are obtained. Tests have shown that the frictional force that is introduced into the shaft when the holder means is pressed on is less than half of the similar force that exists with the heretofore known sealing arrangements. However, of considerably greater significance than the press-on force is that the force gradient during the press-on process is uniform. A typical phenomenon that occurs with heretofore known holder means during the pressing-on process is a stick-slip effect (backsliding), thereby knocking the balls of the pump bearing into their raceway. Such damage to the pump bearing is already caused by relatively slight forces. Therefore, when using the holder means of the state of the art, the pump shaft must be braced against the press-on force via expensive and sensitive apparatus. Consequently, a significant advantage of the inventive construction is that when the holder means is pressed onto the pump shaft, the danger that the holder means will be deformed, and hence its operation will be impaired, and that the pump bearing will be damaged, are considerably reduced or even avoided.

Further specific features of the present invention will be described in detail subsequently.

Description of Preferred Embodiments

Referring now to the drawings in detail, the sealing arrangement illustrated in FIG. 1 essentially comprises a slide ring seal means 6, and a counter ring 3 that is accommodated in a holder means 1. The slide ring seal means 6 has a cup-shaped housing 19 in which are accommodated a slip or slide ring 11 and a compression spring 7 that, accompanied by the interposition of support parts 45, 46, is supported against a bellows-type secondary seal 47 that is similarly disposed in the housing. In the assembled state, the inventive sealing arrangement is disposed in a non-illustrated pump housing, against which it is axially supported via a housing flange 48. The slide ring seal means 6 and the counter ring 3 have essentially the same configuration as do known slide ring seal means and counter rings. The slide rings seal means 6 and the counter ring 3 rest against one another in a sealed manner via slide surfaces 9 and 10.

The counter ring 3 is accommodated in a known manner in the holder means 1, which has an annular housing 26 with a U-shaped cross-sectional configuration, the inner leg 22 of which forms a radially widened portion of an inner bore 12 of the holder means 1. The inner leg 22, which is formed by an annular wall, merges into a presser sleeve 25 of the holder means 1. By means of this presser sleeve 25, the sealing arrangement, in the mounted state, is seated securely upon a non-illustrated pump shaft in a press or tight fit. The housing 26 is provided with an inner lining 44 made of elastic material, such as rubber or some other elastomeric material.

The outer surface 54 of the counter ring 3 rests against a corrugated section 50 of an outer holding sleeve 2 of the holder means 1, which holding sleeve 2 is formed by a linear section that lines the outer leg 51 of the housing 26. The outer holding sleeve 2 forms a static seal for the counter ring 3.

The inner lining 44 is integral with a sealing sleeve 4, an inner lining 49 of the presser sleeve 25, and a tubular extension 27 of the presser sleeve 25. The sealing sleeve 4, the presser sleeve 25, and the extension 27 delimit the inner bore 12 of the holder means 1. When the inventive sealing arrangement is mounted on the pump shaft, the sealing sleeve 4 forms a sealing zone I, the presser sleeve 25 forms a tight fit zone II, and the extension 27 forms a holding zone III, all of the holder means 1 (see FIG. 1). The presser sleeve 25 is integral with the housing 26 and is preferably made of metal. The linings 44 and 49, and the sealing sleeve 4, are connected with the housing 26 and the presser sleeve 25, preferably via vulcanization.

As mentioned above, the sealing zone I is formed by the annular rubber sleeve 4, which is disposed in the radially widened portion 22 of the holder means 1 and is fixedly connected therewith, preferably via vulcanization. The position of the sealing zone I within the axial extension of the counter ring 3 has the advantage that that portion of the holder means 1 that projects into the slide ring seal means 6 requires only very little space in the radial direction, so that the inside diameter of the slide ring seal means 6, and hence the radial dimension of the slide ring 11, can be kept small. In this way there is achieved a low slide speed in the sealing gap 33 between the slide surfaces 9 and 10 of the counter ring 3 and the slide ring 11, and hence a correspondingly low temperature level and a low wear of the sliding partners namely the slide ring 11 and the counter ring 3.

The inside diameter of the sealing sleeve 4 is about 2 to 10% less than the diameter of the shaft, which is indicated by the dot-dash line D—D in FIG. 1.

To improve the sealing effect, the support and contact surface 23 of the sealing sleeve 4 with the pump shaft can be provided with a so-called corrugation. The individual corrugations can have the same inside diameter; however, the furthest outwardly disposed corrugation advantageously has a smaller inside diameter and thus forms the circumferential sealing edge 24.

When the holder means 1 is pressed on to the pump shaft or some other shaft the sealing sleeve 4 is radially compressed between the radially widened portion 22 and the shaft diameter D—D, thereby absolutely reliably sealing off the leakage distance between the holder means 1 and the pump shaft. Due to the relatively large radial thickness and the large volume of the sealing sleeve 4, correspondingly large deformation displacements in a radial direction are possible so that a reliable sealing of the leakage distance is insured even where relatively large diameter tolerances of the inside diameter of the sealing sleeve 4 exist. In this way, the functional reliability of the sealing arrangement is not only improved, but the sealing arrangement is less complicated and hence less expensive to produce. The tight fit zone II, which when viewed in the direction toward the slide ring seal means 6 adjoins the sealing zone I, is disposed essentially radially inwardly of the slide ring 11 and has approximately the same or a smaller axial extension then does the slide ring 11.

The tight fit zone II is formed by the presser sleeve 25, which is a tubular extension of the housing 26 of the counter ring holder means 1. The seating or inner surface 12 of the tubular extension, i.e. the presser sleeve 25, via which the holder means is pressed upon the pump shaft, can either be plain or bare metal, or can be totally or partially coated with a thin rubber layer that can be easily formed when the sealing sleeve 4 is vulcanized on. However, the seating surface 12 can also intentionally be provided with a relatively thin rubber layer that is either smooth or is provided with a profiling that extends in the axial or circumferential directions.

The overall length of the housing 26 of the holder means 1 is relatively short, as a result of which a favorable drawing condition results during a deep drawing manufacturing process. The manufacture of the housing 26 is thus significantly simplified in contrast to conventional housings for sealing arrangements; in other words, less expensive materials that have poor deep drawing properties can be utilized for the housing.

Adjoining that end of the presser sleeve 25 that is disposed remote from the sealing sleeve 4 is the holding zone III, which is formed by the tubular extension 27. At its free end, the extension 27 is widened in a funnel-like manner and forms a stop or abutment 28 that is inclined relative to the line D—D in FIG. 1 by an angle $\alpha$ of advantageously 45°.

In the non-installed state of the sealing arrangement illustrated in FIG. 1, the outer side or abutment surface 29 of the abutment 28 rests against an abutment surface 30 of the sealing housing 19. The slide ring seal means 6 is designed in such a way that in the non-installed state the sealing arrangement has an overall length L1, at which the compression spring 7 is under preload. This prevents impurities from being able to enter the sealing gap 33 between the slide surfaces 9 and 10. The abutment surfaces 29, 30 advantageously have a conical configuration with the angle $\beta$ that the abutment surface 30 forms with the line D—D being the same as the angle $\alpha$, i e preferably 45°. By the force of the compression spring 7, the abutment 28 is then drawn into a counter cone that is defined by the abutment surface 30. In so doing, the holder means 1 is oriented concentrically relative to the slide ring seal means 6, which simplifies mounting of the sealing arrangement in the pump, and prevents damage to the sealing arrangement.

The conical construction of the abutment surfaces 29, 30 has the advantage that due to the spring force compressive forces are generated that are uniformly distributed over the periphery of the abutment 28. Due to the incompressibility of the rubber material that is used for the holding zone III, the spring forces that occur can be reliably supported, even where the abutment 28 has a relatively small thickness of as little as 0.5 mm. These thin walls have the advantage that the amount of rubber material that is required as well as the space that is required, especially in the radial direction in the tight fit zone II and the holding zone III, are very small.

An important advantage of the described configuration of the holding zone III is that the counter ring holder means 1 and the slide ring seal means 6 can easily be assembled to form the sealing arrangement by folding the abutment 28 together in a radially inward direction, so that the tight fit zone II and the holding zone III can be introduced without difficulty into an inner bore 36 of the slide ring seal means 6 The sealing arrangement is then compressed to an overall length that is less than L1. When the holding zone III is released, it again assumes its original shape, as illustrated in FIG. 1, due to the elastic characteristic of the material thereof. Without the presence of a force that counteracts the compression spring 7, the sealing length assumes the length illustrated in FIG. 1, where the abutment limitation comprising the two abutment surfaces 29 and 30 becomes effective.

If now a finish mounted sealing arrangement is to be removed, for example in order to visually inspect the same, this can be carried out in a straightforward manner in that in addition to the force of the compression spring 7, a further similarly directed force is exerted upon the counter ring holder means 1 until the holding force of the abutment 28 is overcome, and the counter ring holder means 1 can be withdrawn from the slide ring seal means 6. After inspection has been completed, the counter ring holder means 1 can again be installed Installation and removal of the counter ring holder means I can thus be repeatedly carried out without damaging the sealing arrangement.

To facilitate installation of the sealing arrangement into the pump, the tubular extension 27 of the holding zone III can have an inner diameter that is larger than that of the presser sleeve 25 and that forms a preliminary centering means 31 for the pump shaft. The inside diameter of the preliminary centering means 31 is slightly greater than the diameter of the shaft. By means of the preliminary centering means 31, the sealing arrangement can be pressed on to the end of the shaft, for example manually, during installation into the pump. As a result, the sealing arrangement is satisfactorily preliminarily centered relative to the pump housing and to the insertion tool, so that damage to the sealing arrangement is reliably prevented.

Figure 2:
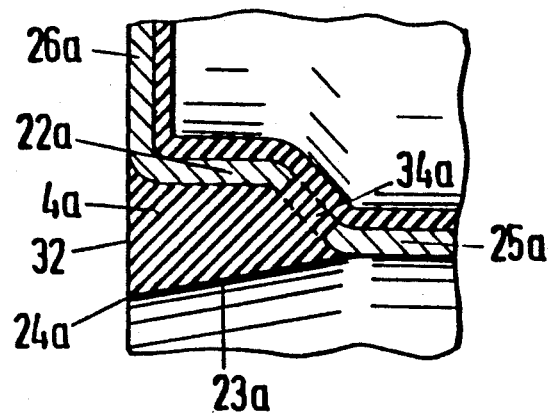
FIG. 2 is an axial cross-sectional view through a portion of a second exemplary embodiment of the inventive sealing arrangement.

FIG. 2 shows a further embodiment of a sealing sleeve, here designated 4a. In this embodiment, the contact surface 23a, rather than being provided with a corrugated section as was the case with the sealing sleeve 4 of FIG. 1, tapers from the presser sleeve 25a of the housing 26a outwardly in a direction toward a radially extending endface 32 of the sealing sleeve 4a, which forms a circumferential sealing edge 24a with the contact surface 23a.

In the embodiments of the sealing arrangements shown in FIGS. 1 and 2, the outer holding sleeve 2 for the counter ring 3 is integrally formed with the sealing sleeve 4, 4a as well as with the tubular extension 27 and the funnel-shaped abutment 28, and is fixedly connected with the counter ring holder means 1, advantageously via vulcanization. To facilitate the single-piece manufacturer of all regions that are made of the highly elastic material, connecting locations are advantageously provided between the individual regions. As shown in FIGS. 1 and 2, the connecting regions are formed by exude-through openings 34, 34a formed within the radially widened portion 22, 22a of the housing 26, 26a that is formed by an annular wall.

Figure 4:
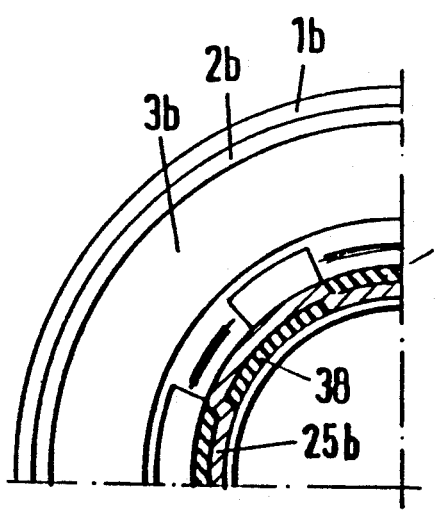
FIG. 4 is a cross-sectional view taken along the line IV—IV in FIG. 3.
Figure 3:
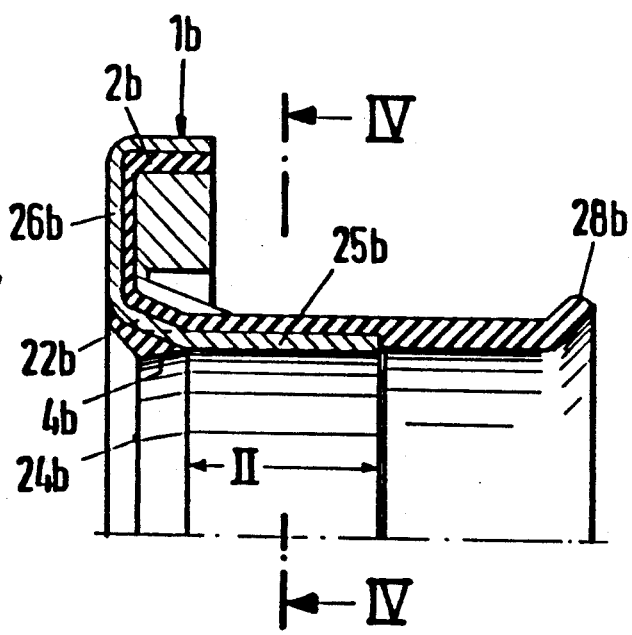
FIG. 3 is an axial cross-sectional view through the counter ring and the holder means of a further exemplary embodiment of the inventive sealing arrangement.

A further embodiment of the connecting locations is illustrated in FIG. 3. In this embodiment, as shown in FIG. 4, in the tight fit zone II of the holder means 1b, the presser sleeve 25b of the housing 26b of the holder means has a meander-like configuration. In this way, outer and inner connecting channels 37 and 38 respectively are formed via which during the manufacture of the holder means 1b the elastic material can, for example during spraying or injection, flow from the holding sleeve 2b out to the funnel-shaped abutment 28b.

This embodiment of the housing 26b has the further significant advantage that due to the meander-like cross-sectional configuration the tight fit zone II has a resilient form in the radial direction and can hence be used where greater shaft diameter tolerances exist. Conversely, the function of the component, compared with heretofore known embodiments, is reliably insured in a greater tolerance range of the inner diameter of the tight fit of the holder means 1b.

A further difference is that the radially widened portion 22b has a smaller axial length and the presser sleeve 25b has a greater axial length than was the case with the embodiment of FIG. 1. The sealing sleeve 4b has a triangular cross-sectional configuration, with the sealing edge 24b thereof being disposed approximately in the middle.

Figure 5:
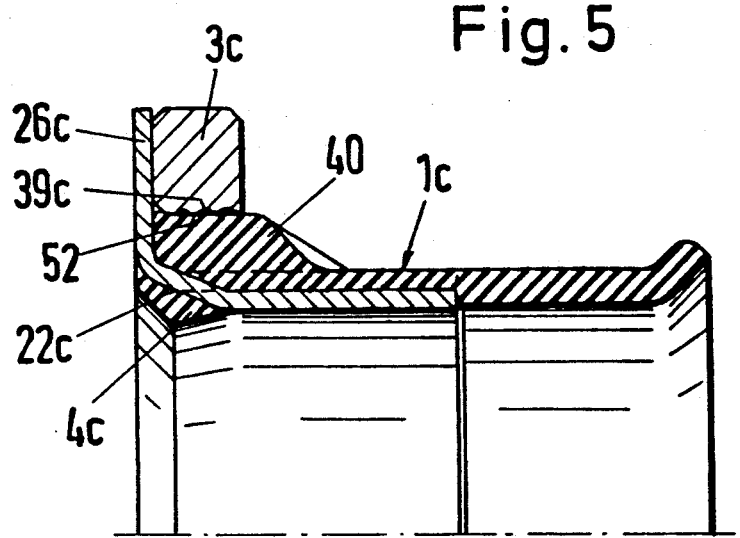
FIGS. 5-7 are each axial cross-sectional views through the counter ring and holder means of further exemplary embodiments of inventive sealing arrangements.

FIG. 5 shows a specific inventive embodiment of a holder means 1c where the counter ring 3c is not encircled from the outside by the holder means, in contrast to the embodiments illustrated in FIGS. 1 to 4. Rather, the inner bore 52 of the counter ring 3c is tightly seated via a force fit on the corrugated abutment surface 39c of an inner holding sleeve 40. The holding sleeve 40 extends to about half the height of the housing 26c, which in this embodiment comprises only a radial wall that adjoins the radially widened portion 22c. The end face of the counter ring 3c rests against the radial wall of the housing 26c without the interposition of a lining. The sealing sleeve 4c has essentially the same configuration as does the sealing sleeve 4b.

This embodiment has the advantage that due to the fact that the inner lining 44 (FIG. 1), which acts as a thermal insulation, is missing from between the counter ring 3c and the housing 26c, a better dissipation of the frictional heat that results in the sealing gap is possible. As a result, the surface life of the sealing element is considerably increased.

In addition, the housing 26c has an extremely straightforward configuration, and the material that is required for the highly elastic components of the sealing element or arrangement is reduced even further than with the embodiments of FIGS. 1 to 4.

Figure 6:
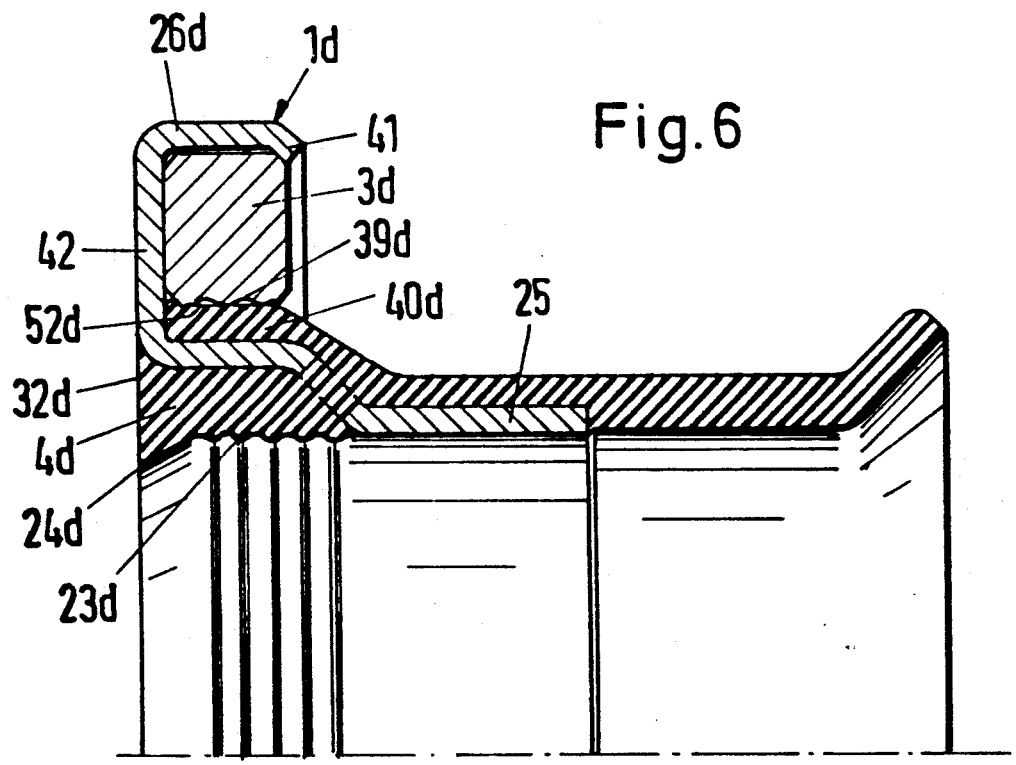

FIG. 6 shows a further counter ring holder means 1d where the counter ring 3d is encircled from the outside by the housing 26d, as with the embodiment of FIG. 1.

As with the embodiment of FIG. 5, the medium-tight connection between the counter ring 3d and the holder means 1d is achieved by the inner sleeve 40d, against the corrugated abutment surface 39d of which the inner bore 52d of the counter ring 3d rests. In addition, with the embodiment of FIG. 6, due to the flange 41 at the end of the radially outer annular wall of the housing 26d, a very good planar contact of the counter ring 3d against the radial wall 42 of the holder means housing 26d is ensured that cannot alter during operation of the sealing element. This configuration is of extreme significance for a satisfactory sealing function of the sealing element.

A further advantage of the embodiment of FIG. 6 is that an additional positive connection is produced by the flange 41 between the housing 26d and the counter ring 3d, with this positive connection insuring an extremely high reliability against twisting of the counter ring holder means 1d and the counter ring 3d relative to one another. The sealing sleeve 4d has a similar configuration to that of the sealing sleeve of FIG. 1, with the difference that the sealing edge 24d is disposed at the level of the endface 32d of the sealing sleeve and in the vicinity of the sealing edge 24d the inside diameter of the sealing sleeve is considerably smaller than in the vicinity of the profiled contact surface 23d.

Figure 7:
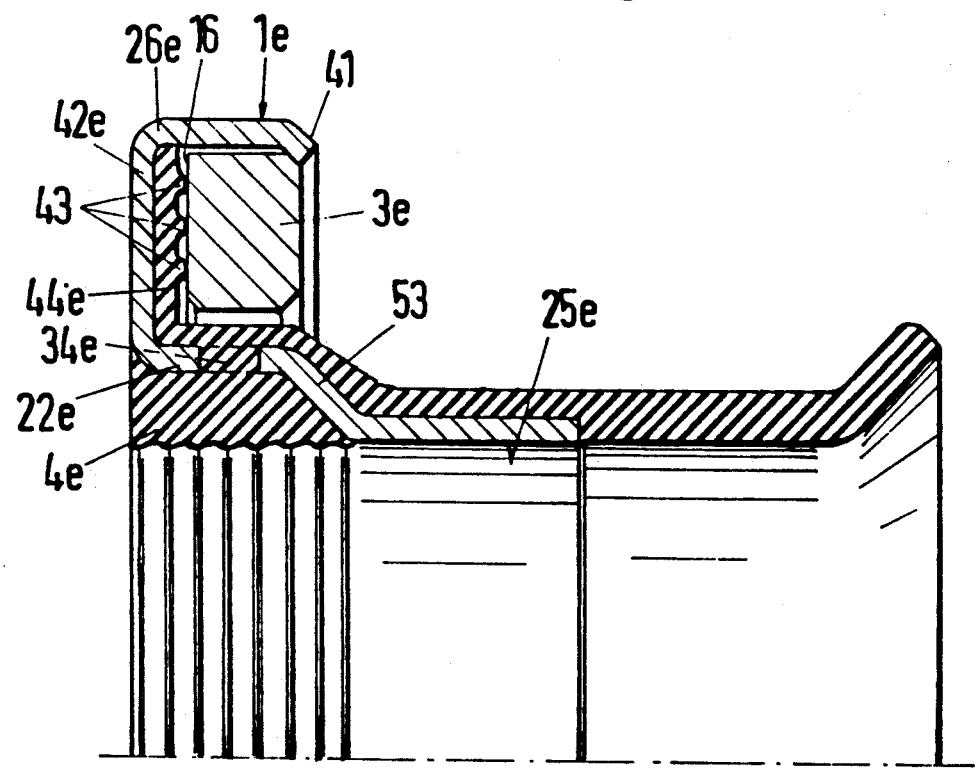

The embodiment of FIG. 7 differs considerably from that of FIG. 6. Whereas with the embodiment of FIG. 6 the medium-tight connection between the counter ring holder means 1d and the counter ring 3d is achieved by the radial force fit between the inner bore 52d of the counter ring and the inner holding sleeve 40d, in the embodiment of FIG. 7 the medium-tight connection is effected exclusively by axial deformation or compression of the inner lining 44e of the holder means 1e. To improve the seal, circumferential sealing beads 43 that increase the surface pressure are provided at various locations on the inner lining 44e.

In the embodiment of FIG. 7, the lining 44e extends along only the inner sides of the radially inner annular wall 22e and the radially extending wall 42e of the housing 26e; no outer holding sleeve, as with the embodiment of FIG. 1, is provided. The backside 16 of the counter ring 3e that faces the wall 42e rests against the corrugated inner side of the lining 44e. The sealing sleeve 4e has essentially the same configuration as the sealing sleeve of the embodiment of FIG. 1. In contrast to the embodiments of FIGS. 1, 2, and 6, with this embodiment the exude-through openings 34e are not provided in a transition section 53 that connects the annular wall 22e with the presser sleeve 25e, but rather are provided in the annular wall.

The holder means of FIG. 7 has an extremely important advantage for an economical design, namely that the functional reliability is ensured even with relatively large diameter tolerances of the counter ring abutment surfaces. Such holder means are typical for the sintered materials, such as aluminum oxide or silicone carbide, that for corrosion and wear reasons are preferred for the counter ring.

With the described embodiment of the counter ring holder means, a sealing arrangement is possible that is very sturdy in the face of manufacturing and operational effects, as required by modern quality principles.

The present invention is, of course, in no way restricted to the specific disclosure of the specification and drawings, but also encompasses any modifications within the scope of the appended claims.

What we claim is:

1. In a sealing arrangement, including a slide ring seal means, and a counter ring that is accommodated in a holder means that is provided with a presser sleeve via which in an installed state said sealing arrangement is seated with a press fit on a component that is to be sealed, the improvement wherein:

three zones are provided that are disposed one after the other in an axial direction and in an installed state are disposed about said component that is to be sealed such that said component that is to be sealed extends through all three zones of said sealing arrangement, said zones including, successively, a sealing zone made of elastic material, at tight fit zone formed by said presser sleeve, and a holding zone, with at least said sealing zone and said tight fit zone being made of different materials, with said sealing zone and said presser sleeve being seated on said component that is be sealed, with said sealing zone and said holding zone being made of material that has a higher elasticity than does said presser sleeve, and with said holding zone holding the individual components of said sealing arrangement together in an axial direction.

2. A sealing arrangement according to claim 1, in which said sealing zone is made of a material having a very high elasticity.

3. A sealing arrangement according to claim 2, in which said material is rubber.

4. A sealing arrangement according to claim 1, in which said holding zone is made of a material having a high elasticity.

5. A sealing arrangement according to claim 4, in which said material of said holding zone is rubber.

6. A sealing arrangement according to claim 4, in which said holding zone and said sealing zone are made of the same material.

7. A sealing arrangement according to claim 4, in which said sealing zone and said holding zone are integral with one another.

8. A sealing arrangement according to claim 7, in which said sealing zone has a smaller inside diameter than at least one of said presser sleeve and said holding zone.

9. A sealing arrangement according to claim 8, in which said holding zone has a greater inside diameter than does said presser sleeve.

10. A sealing arrangement according to claim 9, in which at least one of said sealing zone and said holding zone is connected to said presser sleeve via vulcanization.

11. A sealing arrangement according to claim 1, in which said slide ring seal means includes a housing and a slide ring disposed therein; and in which an abutment means of said holding zone rests against a counter abutment of said slide ring housing.

12. A sealing arrangement according to claim 11, in which said holding zone rests flush against said counter abutment.

13. A sealing arrangement according to claim 11, in which said abutment means and said counter abutment are inclined at the same angle of preferably approximately 45° relative to a longitudinal axis of said sealing arrangement.

14. A sealing arrangement according to claim 1, in which an inner contact surface of said sealing zone is at least partially profiled.

15. A sealing arrangement according to claim 14, in which an end of said sealing zone remote from said presser sleeve is tapered and forms a sealing edge.

16. A sealing arrangement according to claim 14, in which said holder means includes a housing that has an annular wall to which is vulcanized a sealing sleeve on which said sealing zone is provided.

17. A sealing arrangement according to claim 16, in which said sealing sleeve is tapered in a funnel-shaped manner in a direction toward a sealing edge thereof.

18. A sealing arrangement according to claim 16, in which said housing of said holder means also has a radially extending wall against which said counter ring rests and which adjoins said annular wall, which forms a radially widened portion of said holder means and in turn adjoins said presser sleeve.

19. A sealing arrangement according to claim 18, in which said annular wall is surrounded by said sealing sleeve and a portion of at least one of an inner lining, and an inner holding sleeve of said housing of said holder means.

20. A sealing arrangement according to claim 19, in which said radially widened portion of said holder means is provided with openings, preferably exude-through openings, for said sealing sleeve.

21. A sealing arrangement according to claim 19, in which said radially widened portion of said holder means is profiled, preferably in a meander-like fashion.

22. A sealing arrangement according to claim 1, in which said counter ring, via the interposition of a profiling that extends in at least one of an axial and radial direction, rests against at least one of a holding sleeve and an inner liner of said holder means.

23. A sealing arrangement according to claim 22, in which at least one of said holding sleeve and said inner liner has a profiled abutment surface.

* * * * *